Nov. 22, 1932.   J. C. CROMWELL   1,888,374
METHOD OF MAKING ARTICLES OF MANUFACTURE
Filed June 9, 1928   7 Sheets-Sheet 1
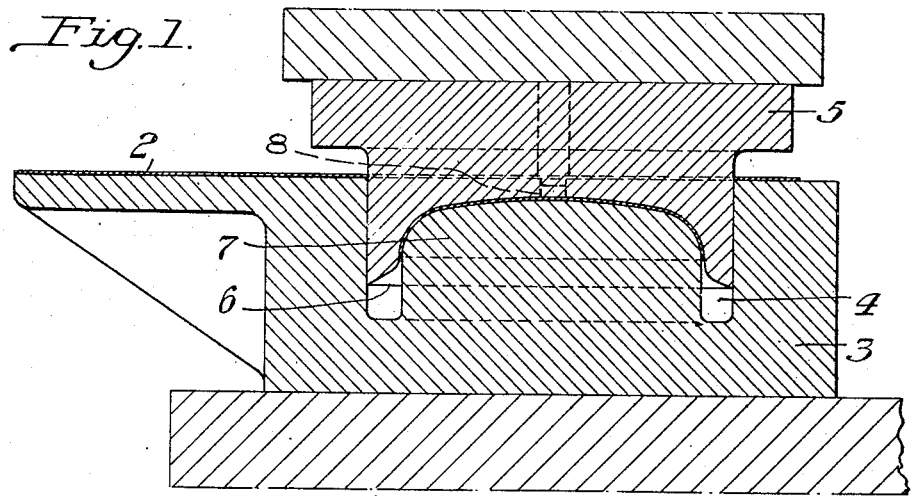
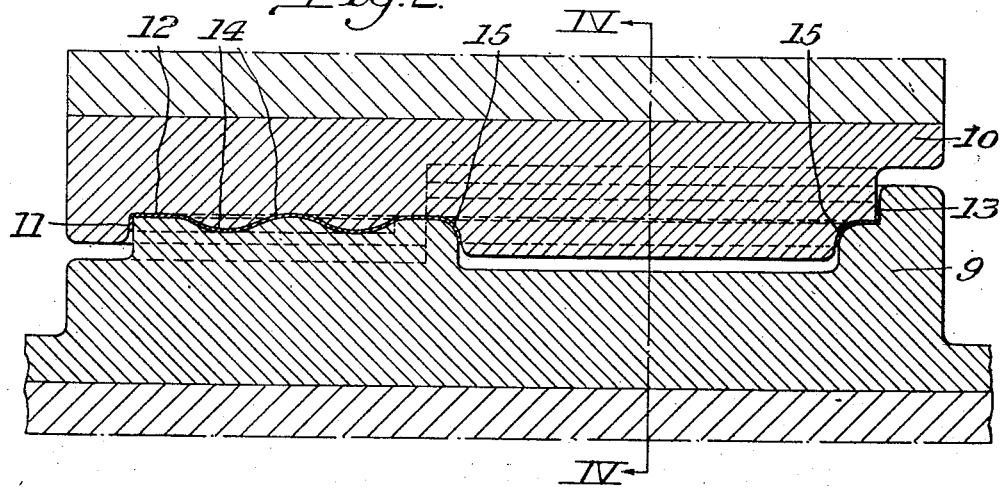
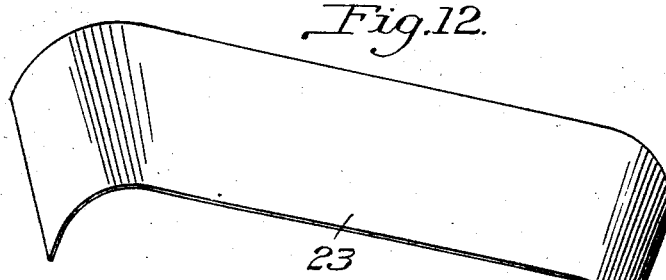
INVENTOR
John C. Cromwell,
his Atty.

Nov. 22, 1932.  J. C. CROMWELL  1,888,374
METHOD OF MAKING ARTICLES OF MANUFACTURE
Filed June 9, 1928   7 Sheets-Sheet 2
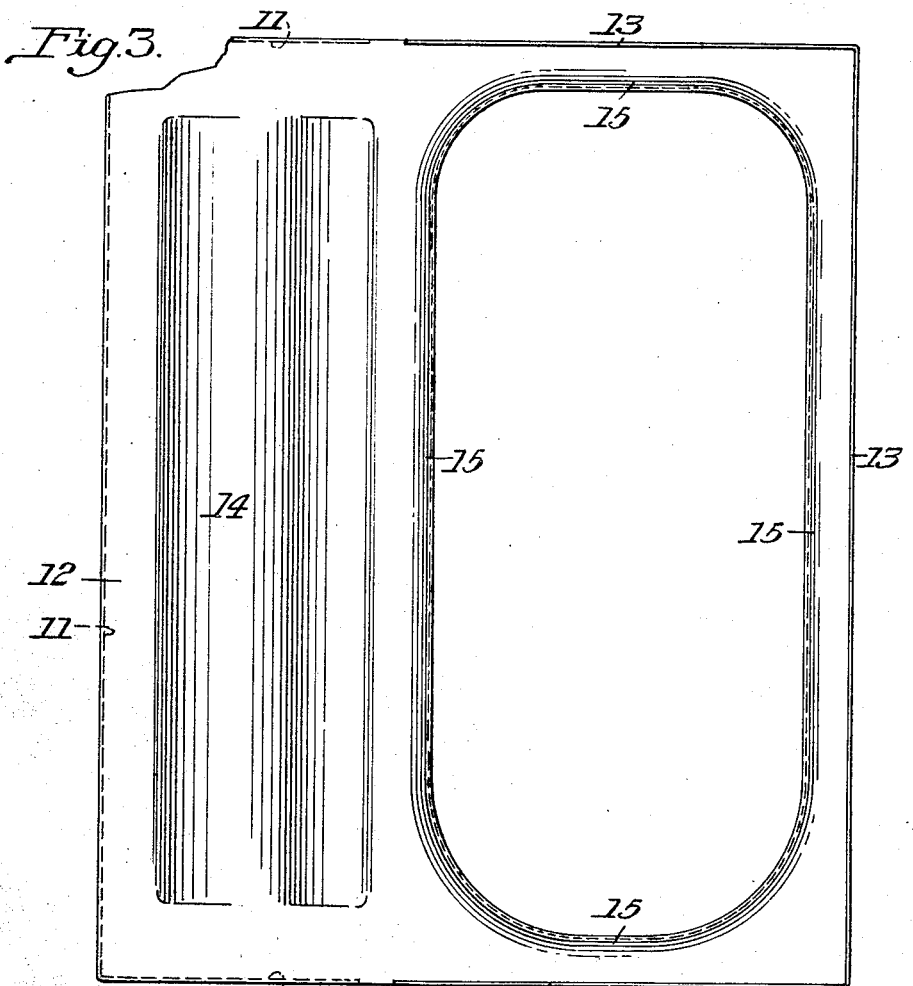
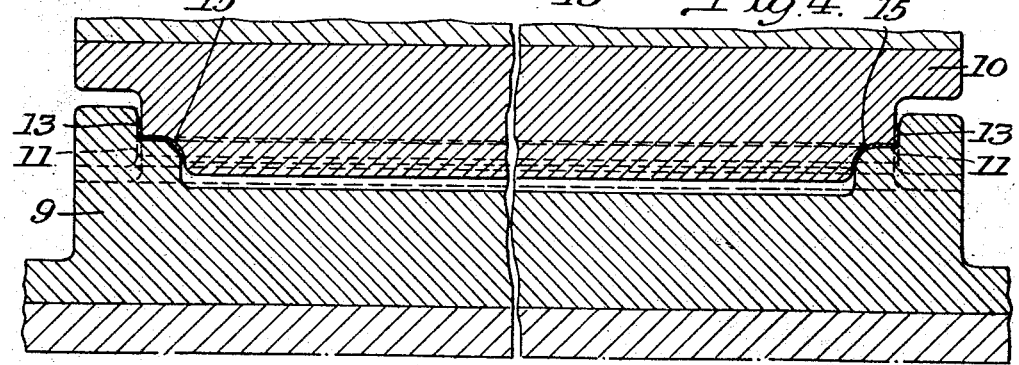
INVENTOR Nov. 22, 1932.   J. C. CROMWELL   1,888,374
METHOD OF MAKING ARTICLES OF MANUFACTURE
Filed June 9, 1928   7 Sheets-Sheet 3
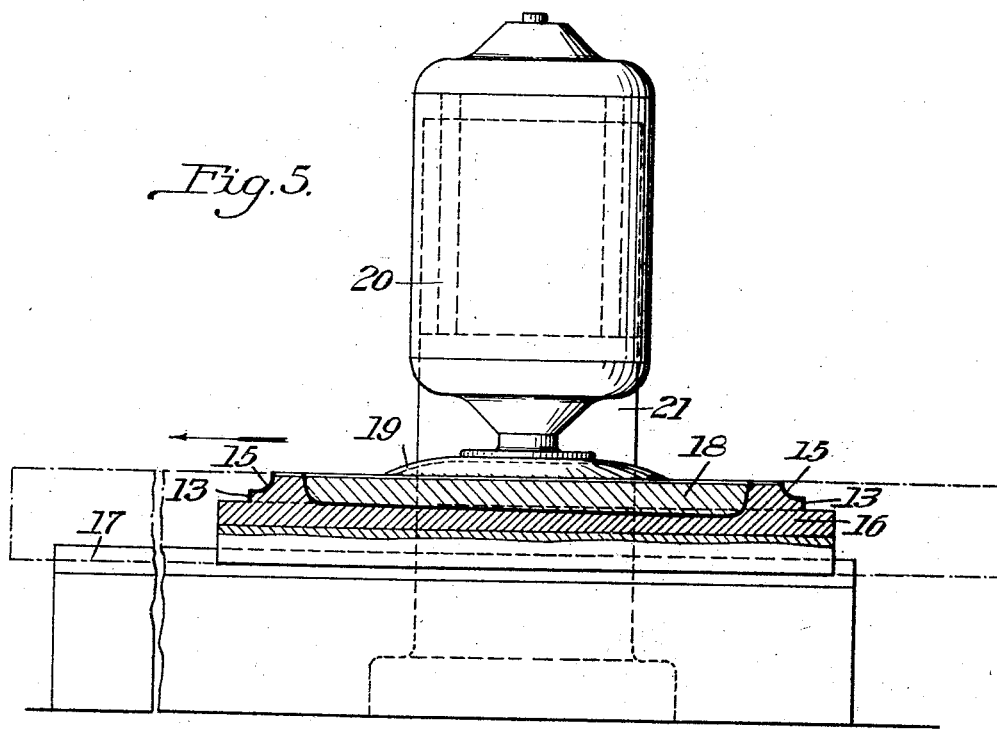
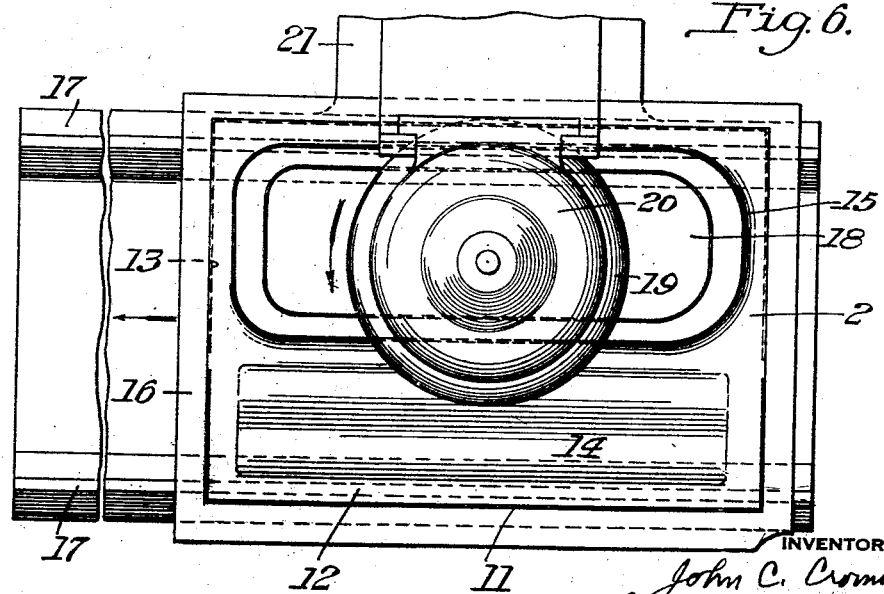

Nov. 22, 1932.  J. C. CROMWELL  1,888,374
METHOD OF MAKING ARTICLES OF MANUFACTURE
Filed June 9, 1928  7 Sheets-Sheet 4
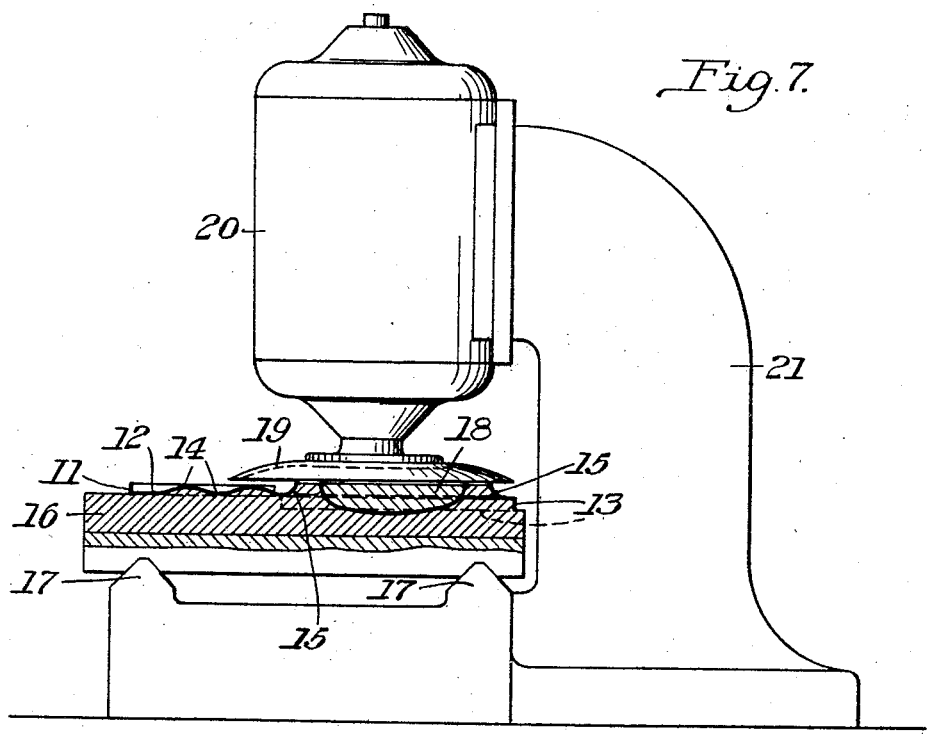
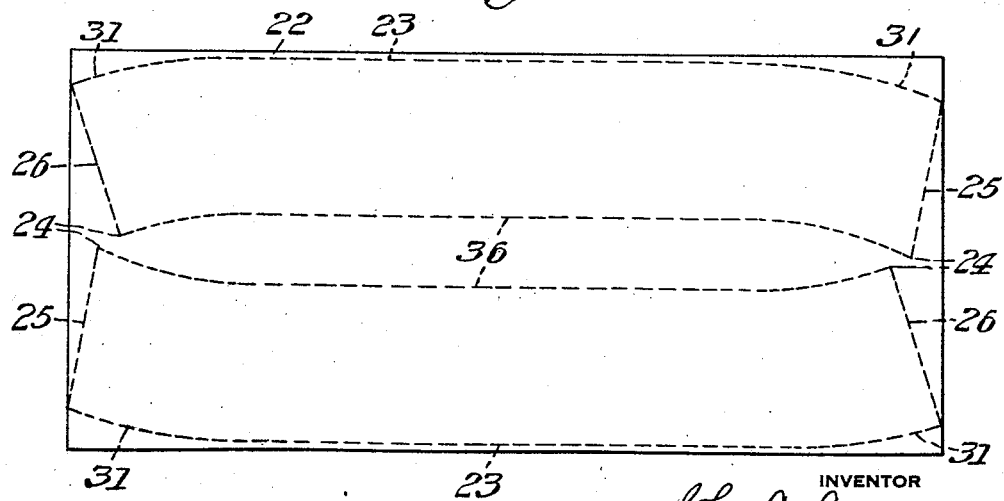
INVENTOR
John C. Cromwell Nov. 22, 1932.  J. C. CROMWELL  1,888,374

METHOD OF MAKING ARTICLES OF MANUFACTURE

Filed June 9, 1928  7 Sheets-Sheet 5

INVENTOR
John C. Cromwell,
Byrnes, Stebbins & Parmelee,
his Attys.

Nov. 22, 1932.　　　　J. C. CROMWELL　　　　1,888,374

METHOD OF MAKING ARTICLES OF MANUFACTURE

Filed June 9, 1928　　　7 Sheets-Sheet 6

Nov. 22, 1932.　　　J. C. CROMWELL　　　1,888,374
METHOD OF MAKING ARTICLES OF MANUFACTURE
Filed June 9, 1928　　　7 Sheets-Sheet 7
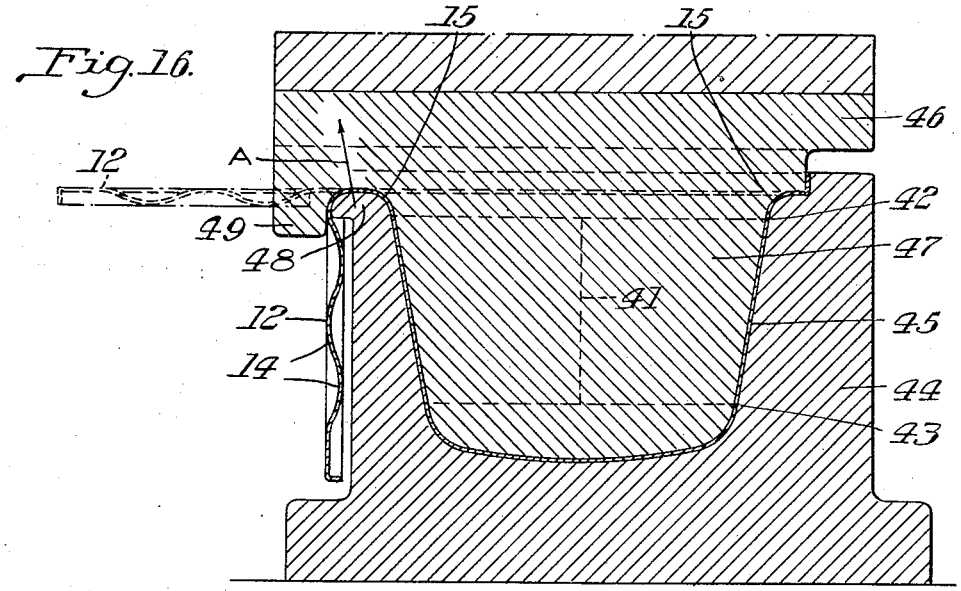
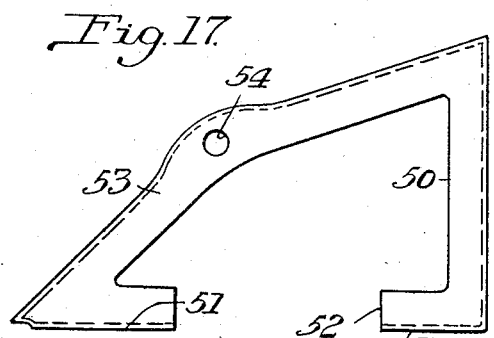
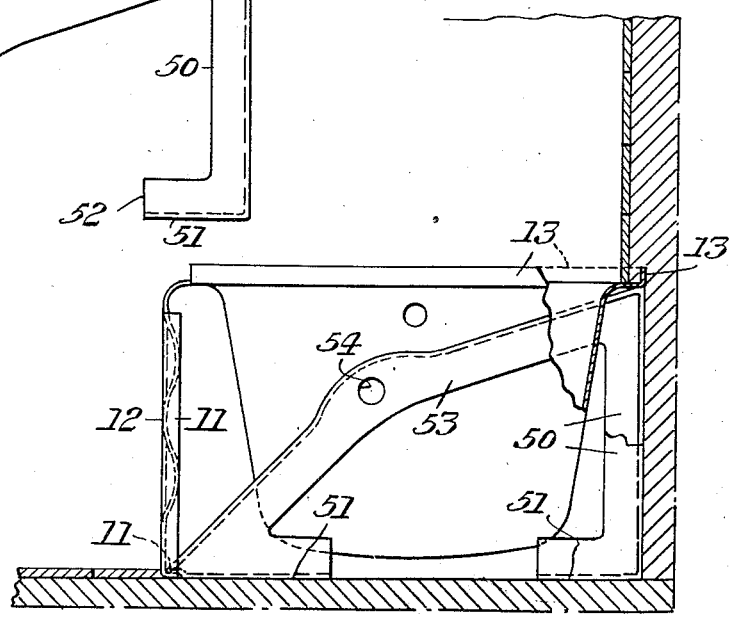
INVENTOR
John C. Cromwell,
Byrne, *illegible* Parmelee
his attys Patented Nov. 22, 1932

1,888,374

UNITED STATES PATENT OFFICE

JOHN C. CROMWELL, OF ALLIANCE, OHIO, ASSIGNOR TO THE STEEL SANITARY COMPANY, OF ALLIANCE, OHIO, A CORPORATION OF OHIO

METHOD OF MAKING ARTICLES OF MANUFACTURE

Application filed June 9, 1928. Serial No. 284,173.

The present invention relates broadly to the art of sheet metal ware making, and more particularly to the production of receptacles such as bath tubs, so-called stationary tubs, sinks, and the like.

It is customary in the art to which this invention relates, and general practice in the United States, in the manufacture of bath tubs to make use entirely of a casting process. Foundry practice requires a casting of such thickness that the finished article is necessarily several times heavier than would be a corresponding article manufactured from sheet metal.

It is also impossible to produce as uniform and smooth a surface with the casting process as is possessed by a rolled sheet.

In an effort to overcome the present objectionable features with respect to weight and surface characteristics of cast iron tubs as now manufactured, efforts have heretofore been made to produce tubs from a single piece of sheet metal by deep drawing operation. In order to provide a sheet having the required dimensions to permit a draw of the necessary depth there has resulted a wastage in metal of from 30 to 40% from the rectangular sheet as supplied by the mill.

In addition to this, it has been necessary to subject the article to successive drawing and annealing operations in order to obtain the ultimate shape desired, both of which operations involve a considerable expense, and the result being that a finished tub, manufactured in this manner, has cost more than a standard cast iron tub.

Such sheet metal tubs have also been objectionable due to the internal strains set up in the drawing operations which in many cases resulted in such a warping of the tubs during enameling as to render them entirely unfit for commercial purposes.

In Germany the problem is being attacked from the standpoint both of making a thinner casting, and from the standpoint of producing a sectionalized sheet metal tub, the parts of which are hand shaped and welded. Cast iron tubs as thin as 1/8 of an inch in some parts are being produced at the present time with this object in view, but obviously possessing disadvantages incident to thin castings of large size. The sectional steel structures, depending upon the process of manufacture utilized, comprise from five to seven separate sections which must be hand-shaped, hand-assembled, and hand-welded, in addition to the usual finishing operations incident to such a process.

The large number of sections and the expensive shaping and assembling operations represented by the present German practice in connection with sheet steel tubs requires such a large amount of labor that it is impossible to commercially manufacture tubs in this country in accordance with such practices.

A sheet steel tub possesses many advantages, among which may be pointed out the smoothness of the surface, thereby insuring a better finish and appearance, and the relatively smaller mass of metal present whereby the entire body of the tub is more quickly brought up to water temperature and the fuel cost for heating the water correspondingly reduced.

In addition to the above, the tub possesses greater strength; may be more easily handled and installed, and due to its lighter weight enables a relatively lighter construction of building floors.

The present invention has for one of its objects the production of a sheet metal receptacle having the general characteristics and advantages referred to in such manner that the wastage of metal is reduced to an absolute minimum, hand labor practically eliminated, and internal strains avoided.

Another object of the invention is to provide a method of manufacturing articles of the general character herein contemplated in accordance with general methods of manufacture suitable for quantity production in this country whereby the cost of the completed article is materially less than the cost of present day articles for the same purpose produced by casting.

In the specification and claims where I refer to articles such as sinks, bath tubs, shower tubs and the like, it will be apparent that such articles are mentioned by way of illustration only, and do not represent limitations of the utility of the invention.

In the accompanying drawings there are shown for purposes of illustration only, and more or less diagrammatically, a series of operations adapted to be carried out in accordance with the present invention for the production of a sheet metal tub of any desired style, it being understood that the drawings do not define the limits of my invention, as changes in the steps and manner of carrying out the same, as well as in the contour and arrangement of the parts may be made without departing either from the spirit of the invention or the scope of my broader claims.

In the drawings:—

Figure 1 is a vertical sectional view through blanking and bottom dies illustrating the same in cooperative relation to a sheet metal blank;

Figure 2 is a vertical transverse sectional view through shaping and flanging dies provided for operating upon a blank leaving the blanking and bottom dies;

Figure 3 is a top plan view of a blank as shaped in the shaping and flanging dies;

Figure 4 is a longitudinal sectional view on the line IV—IV of Figure 2;

Figure 5 is a side elevational view of one form of edge trimming means;

Figure 6 is a top plan view of the construction shown in Figure 5;

Figure 7 is an end elevational view of the construction of Figures 5 and 6;

Figure 8 is a top plan view of a sheet adapted for the formation of side pieces, the figure illustrating such pieces in dotted lines;

Figure 12 is a perspective view of a finished side produced in the side forming dies;

Figure 16 is a vertical transverse sectional view through a pair of finishing dies;

Figure 17 is a side elevational view of a brace for bracing the apron and forming a foot for the tub; and Figure 18 is a vertical sectional view through a portion of a room illustrating a completed tub in end elevation in position therein, certain of the parts being broken away.

Figure 9:
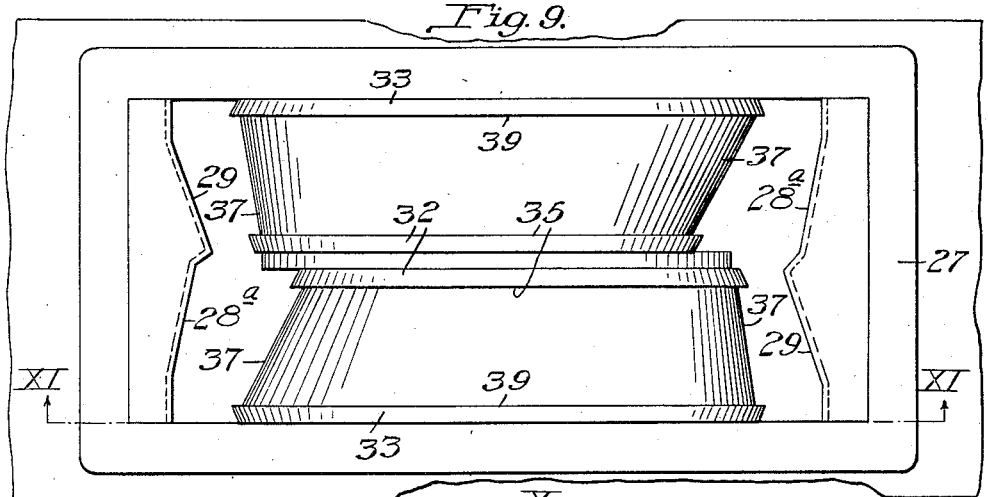
Figure 9 is a top plan view of the bottom die of a pair of side forming dies.

In accordance with the present invention, a piece of metal stock 2, in sheet form of the exact overall dimensions required for a completed tub with respect to width, including the width of the apron, and length, is subjected to a blanking and shaping operation in a blanking and bottom die, as illustrated, for example, in Figure 1. This die comprises a supporting and bottom shaping section 3, having a continuously extending depression 4 formed in the upper edge and of a contour substantially conforming to the peripheral contour of the bottom of a finished tub. Cooperating with the die 3 is a top die 5, having a shearing edge 6. The shearing edge upon engagement with the metal stock supported on the die 3 punches a section therefrom and carries the punched section into engagement with a bottom shaping portion 7, having a punching projection 8 formed thereon for forming a waste outlet in the bottom section.

It will be apparent that in a single operation I punch a section from a piece of metal stock, the dimensions of the punched section being such as to form the desired opening for a top of the tub, and also of such dimensions as to form the bottom of a finished tub.

The blank produced in the blanking and forming die is then placed upon the lower die 9 of a pair of shaping and flanging dies where it is acted upon by the upper die 10. The dies are of such construction as to provide a downturned flange 11, extending substantially continuously around the apron portion 12 of the blank, and a similar upstanding flange 13, extending substantially continuously around the rim of the tub.

At the same time, the apron is subjected to such a shaping operation as to impart the desired contour thereto, such contour usually involving one or more longitudinally extending corrugations 14. The shaping and flanging dies also effect a turning down and rounding of the punched edge 15 of the blank, as clearly illustrated in Figures 2 and 4, in such manner as to form the upper edge of the body of the tub, the body sections being attached thereto as hereinafter described.

Having produced the top blank and the bottom blank, these blanks are placed in a trimming die 16 in the manner illustrated in Figures 5, 6 and 7, with the punched edges thereof projecting in the same direction and supported by the body of the trimming die. The trimming die is preferably mounted for longitudinal movement on suitable ways 17, and may be constructed of magnetic material for holding the blanks firmly in position thereon. The bottom blank may further be held against distortion by dropping a blank or anvil 18 into position therein.

Cooperating with the die 16 is an edge trimming saw 19, of the circular type, being, however, of a dished contour. Such a contour provides a cutting edge projecting downwardly against and into the material to be trimmed, thereby enabling the saw and its driving motor 20 to be bodily lowered on the support 21 to compensate for wear thereof. The action of the saw is such as to provide substantially square edges adapted to cooperate with intermediate body forming sections, as hereinafter described, to permit the expeditious forming of butt welds therewith.

In Figure 8 I have shown a piece of metal stock 22, suitable for the formation of side sections 23, two of which are illustrated in dotted lines in this figure of the drawings. In order to effect a saving of metal in the formation of sides, they are preferably produced from the sheet 22, in reverse end to end arrangements as illustrated. In this manner, the high points 24 of the respective blanks may occupy staggered or overlapping relation one to the other. Each of the blanks has one end portion 25 of relatively slight taper, adapted to produce the desired contour when assembled, and opposite end portions 26 of relatively greater taper adapted to give a relatively greater inclination for the opposite end of the tub.

Figure 11:
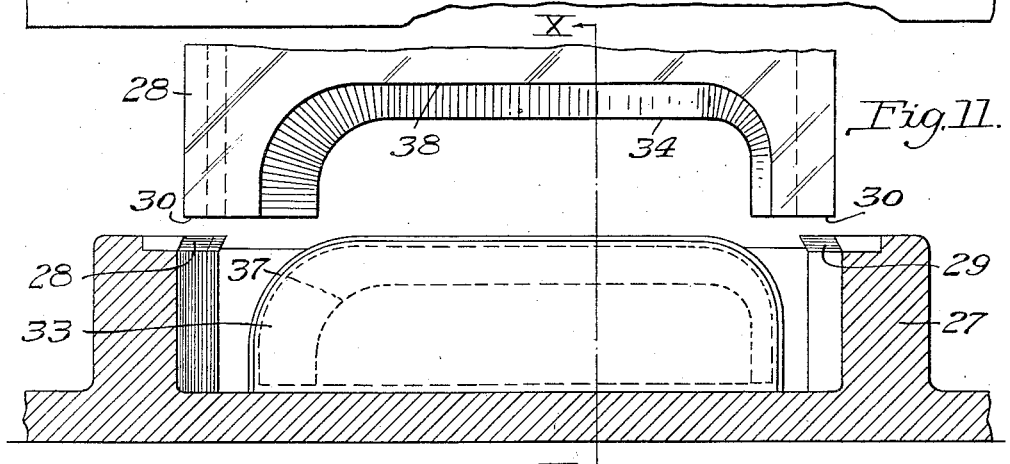
Figure 11 is a sectional view through the side forming dies illustrated in Figure 10, on the line XI—XI of Figure 11.
Figure 10:
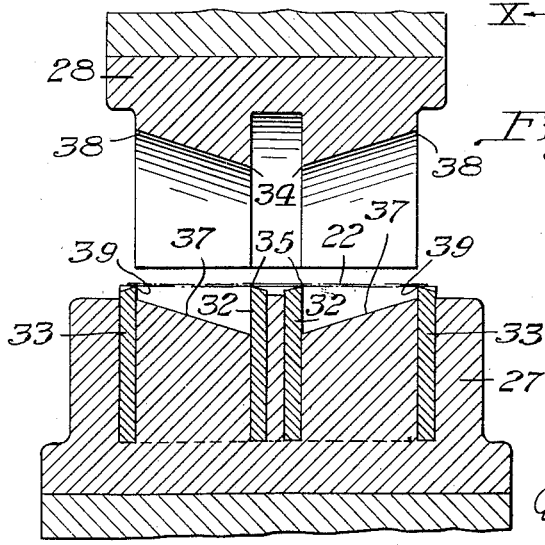
Figure 10 is a vertical sectional view through a pair of side forming dies, the bottom die corresponding to the die of Figure 6.

In accordance with the present invention, the sheet 22 is preferably subjected to such an operation that the side blanks are shaped while in the sheet and sheared in shaped position, thereby providing sheared edges which lie in the desired planes, in order to properly cooperate with the previously trimmed edges of the top and bottom blanks to facilitate welding. These results may be obtained by the use of side forming dies of the character illustrated in Figures 9, 10 and 11, comprising a supporting or bottom die 27, and a movable die 28. The sheet 22 is laid on the supporting die 27, which is provided with shearing edges 28ª at opposite ends cooperating with the portions 25 of relatively slight taper, and with shearing edges 29 cooperating with the portions 26 of relatively greater taper. The movable die 28 has correspondingly shaped shearing edges 30 for cooperation therewith, whereby, upon descent of the movable die, the sheet is initially sheared along the dotted lines 25 and 26 of Figure 8 and along the dotted corner lines 31 of that figure.

Continued descent of the movable die 28 causes the sheet to be bent around the longitudinally extending shearing blades 32 and 33. Thereafter, the shearing edges 34 cooperate with the shearing edges 35 of the blade 32, and shear the sheet 22 along the dotted lines 36 of Figures 8, thereby permitting the blanks, which are to form the sides, to drop downwardly into partial engagement with the forming dies 37. As the movable die 28 continues its downward movement, the shearing edges 38 thereon cooperate with the shearing edges 39 of the blades 33 to trim the outer edges of the sheet 22 to form illustrated in dotted lines, provided any shearing along these lines is required. After this shearing operation, the side blanks 23 are free to drop into engagement with the forming dies 37 so that as the movable die reaches its final position, the side blanks have imparted thereto the contour illustrated in Figure 12 with all of the edges sheared to the exact dimensions and along the exact lines required to permit two such blanks to be placed in abutting engagement, as indicated in Figures 13 and 15 of the drawings, to form the main body of the tub.

Figure 13:
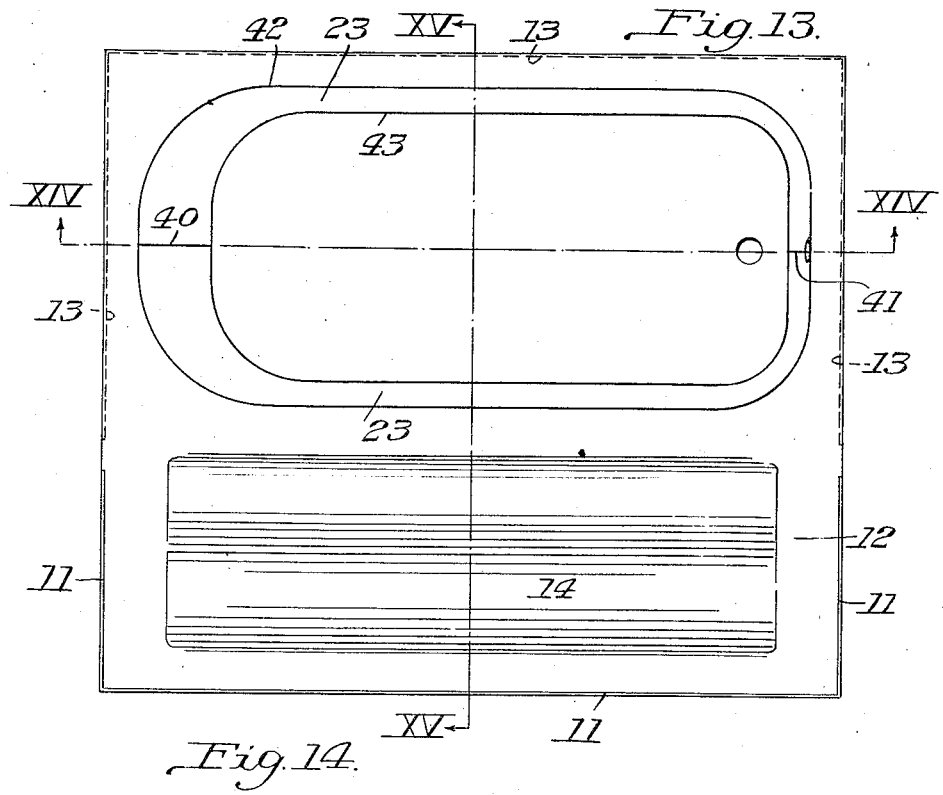
Figure 13 is an inverted plan view showing various parts in shaped and assembled position.
Figure 14:
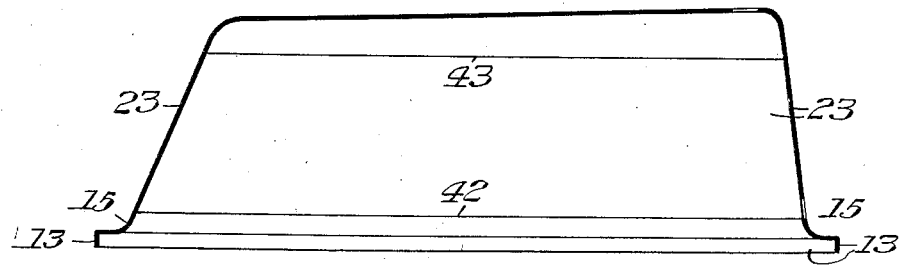
Figure 14 is a vertical longitudinal sectional view on the line XIV—XIV of Figure 13.
Figure 15:
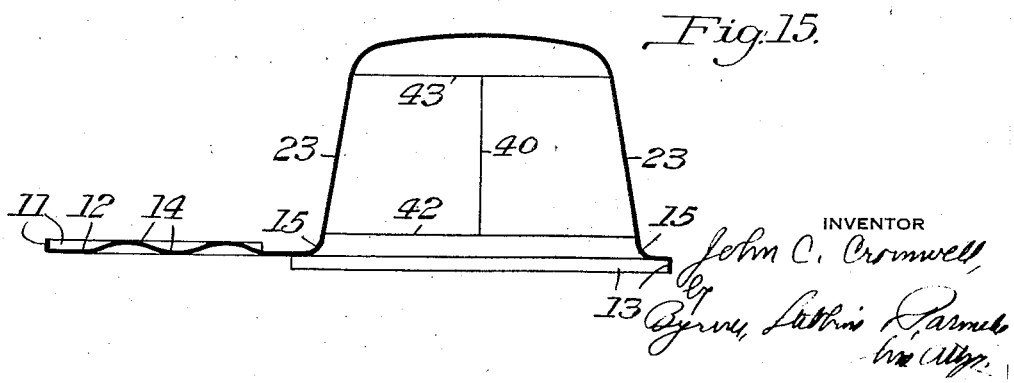
Figure 15 is a vertical transverse sectional view on the line XV—XV of Figure 13.

A pair of side blanks 23 may then be assembled in cooperative relation to top and bottom blanks previously formed in the manner referred to, and as indicated in Figures 13 to 15, both inclusive. When in this position, the parts may be secured together by a simple welding operation which requires welding only along the lines 40 and 41, representing the lines along which the side sections abut at their ends, and the lines 42 and 43 which represent respectively the junction between the sides and the top and the junction between the sides and the bottom, these junction lines extending circumferentially of the tub.

After the parts have been assembled and welded in the manner described, they may be subjected to a final shaping operation in suitable finishing dies as illustrated for example in Figure 16. Such dies, conveniently comprise a bottom die 44, having a recess 45, representing the contour which the finished article is to have, and an upper die 46 having a projection 47 adapted to cooperate with the recess 45. In some cases, I have found it desirable to so dimension the recess 45 and the projection 47 as to insure a slight stretching of all of the parts, although in many cases the stretching may be eliminated entirely and the dies caused merely to effect any reshaping required by distortion resulting from the welding operation or from handling. In many cases, as for example, where comparatively heavy sections of metal have been utilized, the finishing or final shaping operation need not be resorted to.

Where a tub is of the apron type herein referred to, the bottom die 44 will preferably have a lip 48 formed thereon, around which the apron portion 12 may be bend downwardly into the full line position shown in Figure 16, this bending being accomplished by a projection 49 on the die 46. Upon removal of the die 46, the finished article may be stripped from the die 44 by movement substantially along the line indicated by the arrow A.

After the shaping operation of the finishing die, where such shaping operation is resorted to, or after the welding operation where the finishing dies are not utilized, there are welded into position adjacent opposite end of the tub, braces 50, illustrated in Figure 17 of the drawings.

These braces are preferably of such construction as to provide a supporting surface 51, for the tub, the supporting portions conveniently having an opening 52 left therein, through which the necessary plumbing trimmings may be projected. The braces also preferably comprise diagonally extending portions 53 provided with an opening 54, located at substantially the center of gravity of a finished tub and providing convenient means for the attachment of supporting hooks, trunnions or the like, utilized during any subsequent sand blasting, dipping, or other operations. These braces also tie together the apron and the body of the tub and provide, by the supporting surfaces 51, a convenient base under which a peel may be moved for bodily lifting the tubs at any time during their manufacture. This is particularly desirable during the enameling operations and the charging of the tubs into, and the removal from, the furnace in which they are fired.

In Figure 18 I have shown a finished tub in position in a room, and from this showing it will be apparent that the flange 13 in addition to reinforcing the tub, also provides a projection into the wall around which the passage of water by capillary attraction or by gravity is prevented. It also serves more effectively to interlock the tub with a wall, thereby enabling a neater installation to be effected. The flange 11, extending around the apron prevents any subsequent distortion thereof, and maintains the parts of the apron in such position that cracking or spalling of the enameling is prevented.

In accordance with the present invention it is possible to form a completed article from four main sections, punched from two sheets, excluding the braces where such braces are provided. By utilizing the portion removed from one of these sheets forming the top of the tub for the production of the bottom thereof, waste of the metal stock is reduced to a minimum. With respect to the other sheet, the sections produced therefrom are of such shape and are so laid out that there is also a minimum of waste material resulting from their production.

The method herein disclosed further obviates the necessity of utilizing any excessive number of dies, and enables a tub to be formed from dies of comparatively simple construction. In accordance with the invention, it is possible to produce a completed article by the use of three dies, the finishing die being usable or not at the option of the manufacturer. This means that an entire article may be produced ready for welding by three strokes of a standard press capable of a normal operating speed of approximately 7 or 8 strokes a minute. In other words, a tub ready for assembly can be produced on a series of presses corresponding in number to the number of operations at the rate of about four a minute, assuming the utilization of substantially 50% of the strokes of the press. Thereafter, it is only necessary to weld the tubs and apply the braces, followed by the usual finishing operations. Due to the provision of the braces, which afford convenient means of handling the tubs, these operations may be accomplished with extreme rapidity.

The invention is particularly adaptable to the production of bath tubs for the reason that in accordance with present practice the body portions of all such tubs can be of the same general contour. It is therefore only necessary to change the character of the shaping operation for the top sheet in order to produce tubs of different styles. This enables the different styles of tubs of a given length to be produced from a standard set of dies, only the shaping dies of which need be changed to produce the style desired.

While I have herein referred, for purposes of illustration only, to the manufacture of a bath tub and have illustrated dies desirable for use in such manufacture, it will be apparent that exactly the same steps may be followed in the production of containers, receptacles, etc., of a wide variety of different styles, such as sinks, laundry tubs, special foot tubs, shower bath tubs, and the like.

In all cases, an article produced in accordance with the present invention is substantially free from internal strains since all of the parts are produced by simple shaping operations involving no deep drawing of the metal.

An article produced in accordance with the present invention, in addition to being free from internal strains and thereby possessing desirable characteristics not obtainable in the manufacture of similar articles by a series of deep drawing operations, is more desirable than ordinary cast tubs, not only by reason of the greater ease and rapidity with which they may be manufactured, but by reason of their smoother finish, lighter weight, and less cost.

The method herein disclosed enables a section to be punched from a flat sheet along lines normal to the plane of the original sheet in such manner that the sheet may subsequently be utilized for the formation of the top of the tub and the punching shaped and utilized for the formation of the bottom of the tub. This obviates the necessity of separate shaping and severing steps, as would be required in case the sheet were first cupped and a section of the cupped portion subsequently removed along lines parallel to the plane of the original sheet.

I have herein illustrated the invention in connection with the production of a tub of the so-called apron type. It will be obvious, however, that in many cases the apron is not used, and in such event either the same dies may be utilized for all of the sections with the exception of the top, the dies for the top section being changed only as required to give the desired configuration and contour to the rim forming section.

At the present time it is customary to produce tubs of such construction that they are adapted to be tiled in, and other tubs of the so-called rim type. The present invention is adaptable to both classes to tubs by merely changing the top section to conform to standard tube design.

I claim:—

1. In a method of sheet-metal manufacture, the steps comprising punching a section from a sheet, forming the section into a bottom and the sheet into a top rim, disposing said bottom and rim in the reverse of the relative positions they are finally to occupy, and simultaneously trimming the edges thereof.

2. In the method of making sheet metal ware bath tubs, the steps comprising punching a section from a sheet and simultaneously shaping said punched section to form a bottom, shaping the remainder of said sheet to form a rim having an integral apron, forming a body, butt welding said body to said rim and said bottom, and finally bending said apron downwardly so as to cover a side of said body.

3. In the method of making sheet metal ware bath tubs, the steps comprising punching a section from a sheet and simultaneously shaping said punched section to form a bottom, shaping the remainder of said sheet to form a rim having an integral apron, shearing and shaping two similar sections from a single sheet and butt welding them together to form a body, butt welding said body to said rim and said bottom, and finally bending said apron downwardly so as to cover a side of said body.

4. In a method of making bath tubs having rim, apron, body and bottom sections, the steps including punching a portion from a plate, die forming the remainder of the plate to form the rim and apron and the portion to form the bottom section, die forming another sheet to form body sections, assembling the body and bottom sections on the rim and bending down the apron.

In testimony whereof I have hereunto set my hand.

JOHN C. CROMWELL.